United States Patent
Greul et al.

(10) Patent No.: US 9,272,732 B2
(45) Date of Patent: Mar. 1, 2016

(54) METHOD FOR DETERMINING A RACK FORCE FOR A STEERING APPARATUS AND STEERING APPARATUS

(75) Inventors: Roland Greul, Schwaebisch Gmuend (DE); Thomas Werner, Aalen (DE); Joerg Strecker, Pluederhausen (DE)

(73) Assignee: Robert Bosch Automotive Steering GmbH, Gmuend (DE)

(*) Notice: Subject to any disclaimer, the term of this patent is extended or adjusted under 35 U.S.C. 154(b) by 131 days.

(21) Appl. No.: 14/347,822

(22) PCT Filed: Sep. 10, 2012

(86) PCT No.: PCT/EP2012/067597
§ 371 (c)(1),
(2), (4) Date: Mar. 27, 2014

(87) PCT Pub. No.: WO2013/072087
PCT Pub. Date: May 23, 2013

(65) Prior Publication Data
US 2014/0230533 A1 Aug. 21, 2014

(30) Foreign Application Priority Data

Nov. 15, 2011 (DE) .......... 10 2011 055 339

(51) Int. Cl.
*B62D 15/02* (2006.01)
*B62D 6/00* (2006.01)

(52) U.S. Cl.
CPC ............ *B62D 15/0225* (2013.01); *B62D 6/008* (2013.01)

(58) Field of Classification Search
CPC ..... B62D 6/008; B62D 15/0225; G01L 5/221
USPC ....................................................... 73/117.02
See application file for complete search history.

(56) References Cited

U.S. PATENT DOCUMENTS

| | | | | |
|---|---|---|---|---|
| 5,010,488 A * | 4/1991 | Ohshita | ................. | B62D 7/159 180/412 |
| 6,046,560 A * | 4/2000 | Lu | ........................ | B62D 5/0463 180/443 |
| 6,107,767 A * | 8/2000 | Lu | ......................... | B62D 5/046 318/432 |
| 6,631,781 B2 * | 10/2003 | Williams | ............. | B62D 5/0463 180/443 |

(Continued)

FOREIGN PATENT DOCUMENTS

| | | |
|---|---|---|
| DE | 10 2009 002 245 | 10/2010 |
| DE | 10 2010 003 242 | 10/2010 |

(Continued)

*Primary Examiner* — Freddie Kirkland, III
(74) *Attorney, Agent, or Firm* — Jordan and Hamburg LLP

(57) ABSTRACT

A method for determining a rack force for a steering apparatus of a vehicle, in which the rack force is determined as a function of a steering angle variable which characterizes an actual wheel steering angle or a set point of the wheel steering angle. In order to specify a method for determining a rack force, with which a target steering torque can be generated such that a comfortable steering feel is imparted to the driver and the steering apparatus nevertheless gives the driver feedback that is as realistic as possible regarding the motion state of the vehicle, the method comprises: determining a variable which characterizes a lateral force on a shaft of the steering apparatus, and determining the rack force as a function of the lateral force, wherein the determination of the rack force comprises a filtering by means of a signal processing element having a proportional-differential transfer function.

21 Claims, 6 Drawing Sheets

(56) References Cited

U.S. PATENT DOCUMENTS

| | | | | |
|---|---|---|---|---|
| 6,874,595 | B2* | 4/2005 | Mukai | B62D 5/0463 180/446 |
| 7,273,127 | B2* | 9/2007 | Pick | B62D 7/22 180/446 |
| 8,150,582 | B2 | 4/2012 | Blommer et al. | |
| 8,352,125 | B2 | 1/2013 | Gruener et al. | |
| 8,504,260 | B2* | 8/2013 | Stepper | F16D 48/066 192/58.6 |
| 8,788,147 | B2* | 7/2014 | Strecker | B62D 5/0472 180/400 |
| 2004/0083822 | A1* | 5/2004 | Mukai | B62D 5/0463 73/862.195 |
| 2006/0106516 | A1* | 5/2006 | Pick | B62D 7/22 701/41 |
| 2008/0021614 | A1 | 1/2008 | Endo et al. | |
| 2009/0009127 | A1* | 1/2009 | Imamura | G05B 13/025 318/601 |
| 2010/0108432 | A1* | 5/2010 | Okazaki | B62D 6/001 180/446 |
| 2010/0268422 | A1 | 10/2010 | Blommer et al. | |
| 2012/0083972 | A1 | 4/2012 | Gruener et al. | |
| 2014/0058630 | A1* | 2/2014 | Kezobo | B62D 5/0472 701/42 |

FOREIGN PATENT DOCUMENTS

| | | |
|---|---|---|
| DE | 10 2009 002 706 | 11/2010 |
| EP | 1 880 921 | 1/2008 |
| GB | 2 400 358 | 10/2004 |

* cited by examiner

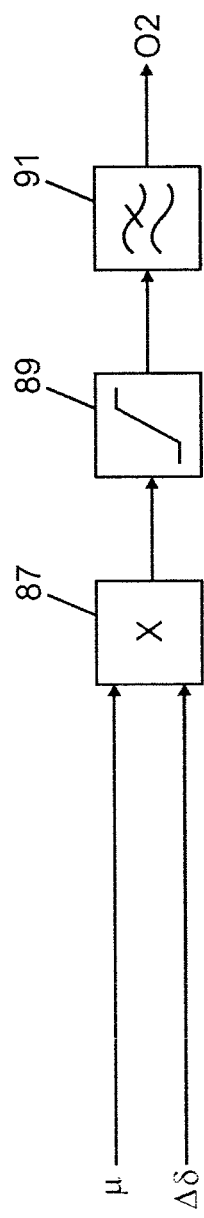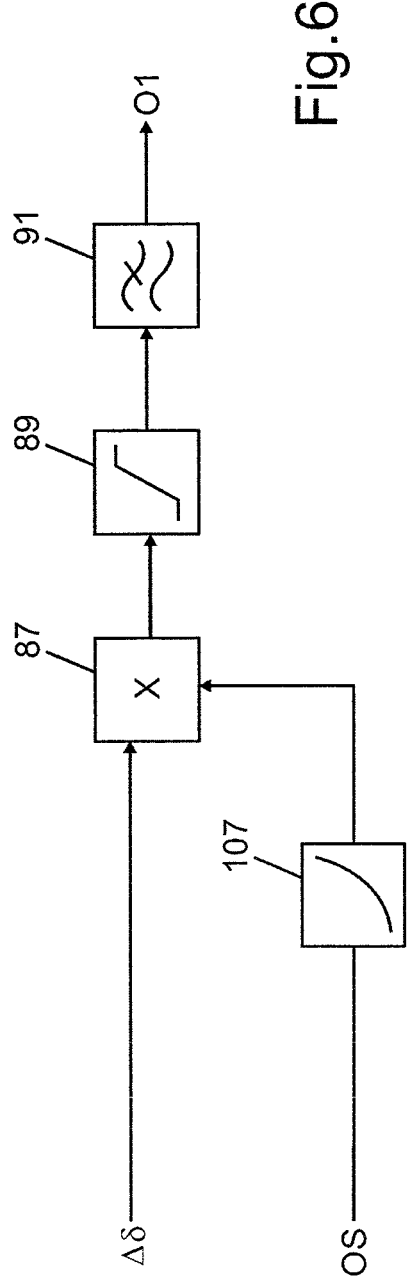

METHOD FOR DETERMINING A RACK FORCE FOR A STEERING APPARATUS AND STEERING APPARATUS

BACKGROUND OF THE INVENTION

The invention relates to a method for determining a rack force for a steering apparatus of a vehicle, in which the rack force is determined as a function of a steering angle variable which characterizes an actual wheel steering angle or a set point of the wheel steering angle. The invention also relates to a control and/or adjustment device for such a steering apparatus and to a corresponding steering apparatus.

In modern steering apparatuses, for example in an electric power steering (EPS) or a steer-by-wire (SbW) steering system, a target steering torque is determined. A steering torque on a steering means of the steering apparatus, for example on a steering wheel, is adjusted to the target steering torque so as to assist the force applied by the driver when steering the vehicle or to counteract the force applied by the driver. It is known to determine the target steering torque as a function of the rack force.

A method for determining a force acting on a steering gear is known from DE 10 2009 002 706 A1. Since in said method the force is determined directly on the basis of a force acting directly on the steering gear, this may include errors caused by properties of the road that is being traveled. For example, unevennesses, ruts or banking of the road lead to such errors. If the target steering torque is determined on the basis of the force that is subject to errors, in many cases this results in a steering feel that is perceived as uncomfortable by the driver.

The object of the invention is to provide a method for determining a rack force, with which a target steering, force can be generated such that a comfortable steering feel is imparted to the driver and the steering apparatus nevertheless gives the driver feedback that is as realistic as possible regarding the motion state of the vehicle. This object is achieved by a method, a control and/or adjustment device and a steering apparatus.

SUMMARY OF THE INVENTION

According to one preferred embodiment, a method for determining a rack force of the type mentioned above is provided, wherein the method comprises: determining a variable which characterizes a lateral force on a shaft of the steering apparatus, and determining the rack force as a function of the lateral force, wherein the determination of the rack force comprises a filtering by means of a signal processing element having a proportional-differential transfer function. The lateral force is a variable which includes information about the current motion state of the vehicle but includes only to a small extent the abovementioned errors caused by the properties of the road. The errors are further reduced by means of the signal processing element. With the method, therefore, a rack force can be determined with which it is possible to generate a target steering torque, which on the one hand is perceived as comfortable and on the other hand includes important feedback regarding the driving state of the vehicle, so that the driver can quickly and intuitively recognize critical driving situations.

The steering angle variable is preferably a measured wheel steering angle of the steering apparatus or a measurement variable, on the basis of which the current wheel steering angle can be calculated. As an alternative, a driver steering wheel angle, which is to say an angle of rotation of a steering wheel, may be provided as the steering angle variable, wherein the driver steering wheel angle can preferably be converted to a corresponding wheel steering angle. It is also conceivable to use a set point of the wheel steering angle as the steering angle variable. The set point may characterize, for example, a desired wheel steering angle, to which the steering angle is to be set.

It is preferred that the signal processing element is a PDT1 element. A PDT1 element can be produced relatively easily and makes it possible to generate the rack force in a fairly precise and reliable manner.

The method can easily be implemented, if it is provided that at least one coefficient, preferably all the coefficients, of a transfer function and/or of an impulse response of the signal processing element are predefined as constant values.

The method can also be configured in an adaptive fashion, if at least one coefficient is varied during the execution of the method. In this case, the signal processing element acts as an adaptive filter.

In this case, it is conceivable that the at least one coefficient is predefined as a function of a vehicle speed or a variable derived therefrom.

It may be provided that an intermediate variable determined by means of the signal processing element is multiplied by a scaling factor.

In this case, it is particularly preferred that the scaling factor is formed as a function of a transverse acceleration of the vehicle. The transverse acceleration of the vehicle may be a modeled transverse acceleration, which can be determined using a mathematical model, for example a vehicle model, or a measured transverse acceleration, which can be detected, for example, by means of an acceleration sensor arranged in or on the vehicle. By way of example, the scaling factor can be reduced as the transverse acceleration increases. In this way, more realistic values can be determined for the rack force.

In order to determine the rack force in a reliable and sufficiently realistic manner, particularly in special situations (for example oversteering, understeering, μSplit situation), it may be provided that the rack force is corrected by modifying a measured wheel steering angle by adding an offset value to the measured wheel steering angle.

It is preferred that, in order to calculate the offset value, a modeled steering angle is determined preferably as a function of a yaw rate, a vehicle speed and a self-steering gradient and is compared with a measured steering angle. In this way, a special situation can be recognized and/or the rack force can be corrected on the basis of this special situation. For calculating the modeled steering angle, use may be made of at least one model equation of the vehicle model, for example.

Preferably, in order to compare the modeled steering angle with the measured steering angle, a steering angle difference is found.

It is particularly preferred that, if the modeled steering angle, or a variable derived therefrom, and the steering angle difference have different signs, an oversteering of the vehicle is detected. As soon as, and for as long as, the oversteering is detected, the rack force can be corrected in order to obtain a value of the rack force which is realistic for the special situation of oversteering.

In order to achieve an adaptation for a μSplit situation in addition to the adaptation of the rack force for the special situation of oversteering, it may be provided that, as a function of the comparison of the modeled steering angle with the measured steering angle, preferably as a function of the steering angle difference, a first correction value for correcting the rack force in the event of oversteering of the vehicle is determined and a second correction value for correcting the rack force in a μSplit situation is determined, and that a maximum of the first correction value and of the second correction value is used as the offset value. As a result, a combined adaptation of the rack force for oversteering and for the µSplit situation is achieved.

It is preferred that a first correction value other than zero is found for as long as the oversteering is detected or the offset value is at least as great as a predefined threshold value. This avoids situation wherein, in the event of a rapid disappearance of the special situation of oversteering, the first correction value changes quickly or jumps and thus the rack force suddenly changes magnitude. Instead, after the disappearance of the original special situation of oversteering, the adaptation for oversteering is continued until the first correction value has fallen back to a sufficiently low value.

It may be provided that an offset value other than zero is found if the speed of the vehicle is at least as great as a speed minimum value. Furthermore, it may be provided that a second correction value other than zero is found, only if no driving round a banking turn is detected.

It may be provided that the rack force is corrected by modifying the transverse acceleration and/or a variable calculated from the transverse acceleration by adding a further offset value to the transverse acceleration or the variable. As a result, for example the rack force for the special situation of understeering can be calculated in a particularly accurate and realistic manner.

In this case, it is preferred that the further offset value is calculated as a function of a signal which indicates the special situation of understeering and/or a degree of understeering, as a function of the transverse acceleration calculated using the vehicle model, as a function of a difference obtained from the calculated transverse acceleration and a measured transverse acceleration, and/or as a function of a detected or determined friction value.

In a further embodiment of the invention, it is provided that the rack force is corrected by modifying it by multiplication by a correction factor. In this case, for example in a special situation, an intermediate variable for the rack force can be reduced by predefining the correction factor accordingly.

In this case it is preferred that the correction factor is calculated as a function of a transverse acceleration of the vehicle. In this way, the rack force can be adapted in the event of the special situation of understeering. In this case, it is possible to determine the correction factor having a value which decreases with a degree of understeering.

A good adaptation of the rack force, which supplies realistic values for the rack force, can be achieved if the correction factor is calculated as a function of a transverse acceleration difference obtained from a transverse acceleration determined using the vehicle model and a measured transverse acceleration.

As an alternative or in addition to this, it may be provided that the correction factor is calculated as a function of a detected or determined friction value. This is because, in the event of a reduced friction value, there is a changed relationship between the steering angle and the transverse acceleration. An increasing steering angle leads to an increase in the transverse acceleration until a saturation point is reached at a certain steering angle, after which a further increase in the steering angle no longer leads to a further increase in the transverse acceleration. If the saturation point is exceeded, the vehicle understeers. At a relatively low friction value, this saturation point corresponds to a smaller steering angle than in the case of a relatively high friction value.

According to a further embodiment of the invention, a control and/or adjustment device for a steering apparatus of a vehicle is provided, wherein the control and/or adjustment device is designed to determine a rack force as a function of a steering angle variable, which characterizes an actual wheel steering angle or a set point of the wheel steering angle, wherein the control and/or adjustment device is designed to determine a variable which characterizes a lateral force on a shaft of the steering apparatus, and to determine the rack force as a function of the lateral force, wherein the determination of the rack force comprises a filtering by means of a signal processing element having a proportional-differential transfer function.

Preferably, the control and/or adjustment device is designed, preferably programmed, to carry out a method according to the invention.

A computer-readable storage medium may be provided, which may, for example, be part of the control and/or adjustment device. There may be stored on said storage medium a program which is programmed in such a way that the control and/or adjustment device carries out a method according to the invention, examples of embodiments of which being described herein, when the program runs on a processor of the control and/or adjustment device.

According to yet another embodiment of the invention, a steering apparatus of a vehicle, comprising a control and/or adjustment device, is provided, wherein the control and/or adjustment device is designed to determine a rack force as a function of a steering angle variable which characterizes an actual wheel steering angle or a set point of the wheel steering angle, wherein the control and/or adjustment device is a control and/or adjustment device according to the invention.

Further features and advantages of the invention will become apparent from the following description, in which examples of embodiments of the invention will be explained in more detail with reference to the drawings.

BRIEF DESCRIPTION OF THE DRAWINGS

FIGS. 2 to 8 show block diagrams of a method for determining a rack force.

DESCRIPTION OF THE PREFERRED EMBODIMENTS

Figure 1:
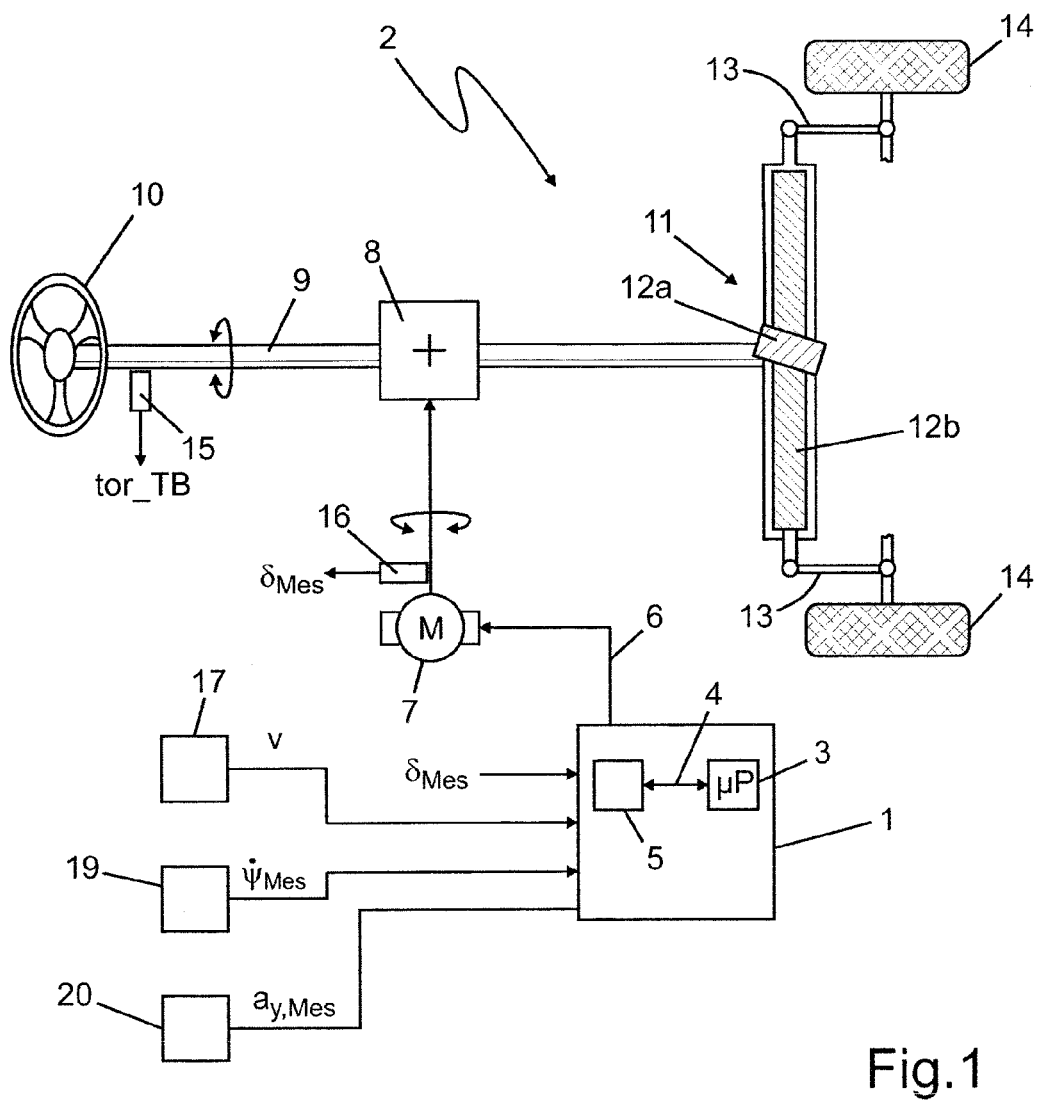
FIG. 1 shows a steering apparatus comprising a control and/or adjustment device for carrying out the method according to the invention.

FIG. 1 shows a control and/or adjustment device which is referred to as the control unit 1 and which is assigned to a steering apparatus 2. Arranged in the control unit 1 is a computer (e.g. microcomputer or microcontroller) having a processor 3, wherein the processor 3 is connected to a storage element 5 via a data line 4, for example a bus system. Via a signal line 6, the control unit 1 is connected to a motor 7, as a result of which a control and/or adjustment of a motor 7 by the control unit 1 is made possible. The motor 7 is configured for example as an electric motor and acts on a torsion bar 9 via a gear mechanism 8. Arranged on the torsion bar 9 is a steering means 10, for example a steering wheel, by means of which a torque can be applied to the torsion bar 9 through actuation of the steering means 10 by a driver.

The steering apparatus 2 further comprises a steering gear 11, which is configured, for example, as a rack-and-pinion steering gear. However, the steering gear 11 may also be configured as a recirculating ball gear or as a ball nut gear. The following description will be based primarily on a rack-and-pinion steering mechanism, wherein the steering gear comprises a pinion 12a and a rack 12b. However, the type of steering mechanism is irrelevant for the invention. The steering apparatus 2 shown in FIG. 1 could be embodied for example as a ball nut steering mechanism or as a single-wheel steering mechanism, instead of as a rack-and-pinion steering mechanism.

The steering gear 11 is connected via the pinion 12a and the rack 12b to a steering linkage 13 on each side of the vehicle, which steering linkage cooperates with a wheel 14.

The steering apparatus 2 further comprises a torque sensor 15 for detecting a steering torque acting on the steering via a steering shaft. In the exemplary embodiment shown in FIG. 1, to this end there is detected by the torque sensor 15 a torsion bar torque tor_TB, which corresponds to the abovementioned steering torque. The steering apparatus 2 also comprises an angle sensor 16 for detecting a rotor angle $\delta_{Mes}$ of the motor 7. The rotor angle $\delta_{Mes}$ corresponds to an angle of rotation of the torsion bar 9 and thus to a steering angle of the wheels 14, since the motor 7 is connected to the torsion bar 9 via the gear mechanism 8 and said torsion bar is connected to the wheels 14 via the steering gear 11 and the steering linkage 13. The values detected by the sensors 15 and 16 are fed to the control unit 1.

The steering apparatus 2 shown in FIG. 1 represents one of many possible embodiments of steering apparatuses suitable for carrying out the method according to the invention. In another embodiment, for example, the steering gear is configured as a ball nut gear. According to another exemplary embodiment, the motor 7 may also be arranged such that it acts together with the torsion bar 9 on the pinion 12a arranged in the steering gear 11 or acts directly, by means of a further pinion, on the rack 12b.

According to a further embodiment, instead of the rotor angle $\delta_{Mes}$, another variable which describes a current position of the steering apparatus 2 is determined and is used to carry out the method according to the invention. By way of example, the steering angle may be determined by means of an angle sensor which is arranged on the torsion bar 9. A current position of the steering apparatus 2 could also be detected by means of a sensor which is arranged on the rack 12b. In principle, many known variables could be determined and used here. However, the use of the rotor angle $\delta_{Mes}$ has the advantage that it can be determined very precisely and is often already available in modern steering apparatuses.

Furthermore, a vehicle in which the steering apparatus 2 is installed has a speed sensor 17, by which a speed v of the vehicle can be detected. The control unit 1 has access to the speed v determined by means of the speed sensor 17. In addition, the vehicle has a yaw rate sensor 19 which is designed to detect a yaw rate ($\dot{\Psi}_{Mes}$), to which the control unit 1 has access. The yaw rate sensor 19 may be part of the steering apparatus 2 or of an electronic stability control system of the vehicle. Moreover, an acceleration sensor 20 is arranged in or on the vehicle, said acceleration sensor being designed to detect a transverse acceleration $a_{y,Mes}$. The control unit 1 can read a value of the transverse acceleration $a_{y,Mes}$ detected by means of the acceleration sensor 20.

Figure 2:
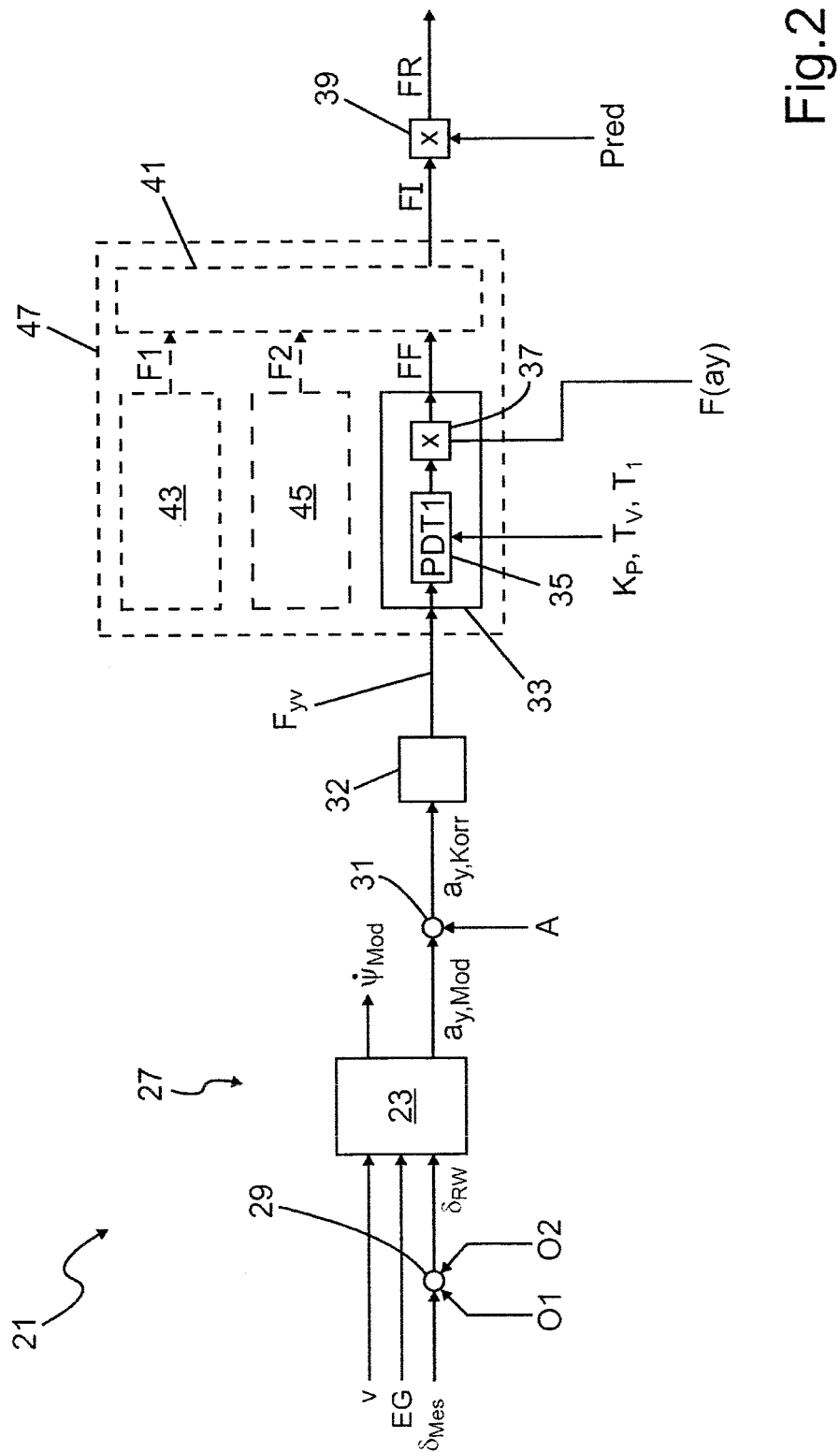

FIG. 2 shows a block diagram of a method 21 for determining a rack force FR. This method 21 can be executed, for example, by the control unit 1. That is to say, the storage element 5 stores a program which is programmed such that the computer 3 executes the method 21 when this program stored in the storage element 5 is run by the processor 3. The method 21 comprises a first functional block 23, which is designed according to a vehicle model 27. The first functional block 23 is designed to calculate a modeled transverse acceleration $a_{y,Mod}$ and a modeled yaw rate $\dot{\Psi}_{Mod}$ as a function of a vehicle speed v, a self-steering gradient EG and a steering angle $\delta_{RW}$. The self-steering gradient EG may be predefined, for example, as a constant value or may be varied as a function of the motion state of the motor vehicle, for example. By way of example, the self-steering gradient EG may be predefined as a function of the vehicle speed v and/or the transverse acceleration $a_y$.

The vehicle model 27 may be, for example, a linear single-track model, which proceeds from the notion of the yaw rate amplification factor. The vehicle model comprises the following model equations:

$$\frac{\dot{\Psi}}{\delta_{PW}} = \frac{v}{I_p + EG \cdot v^2}$$

$$a_y = \dot{\Psi} \cdot v$$

$$F_{yv} = m \cdot a_y \cdot \frac{I_h}{I_v + I_h}$$

Here, the variables $I_F$, $I_h$ and $I_v$ are constants which depend on a geometry, and/or the center of gravity, of the vehicle. Specifically, the variable $I_F$ is the wheelbase of the vehicle. $I_h$ is the distance in the longitudinal direction of the vehicle between the center of gravity of the vehicle and the rear axle. $I_v$ is the distance in the longitudinal direction of the vehicle between the center of gravity and the front axle of the vehicle. Thus, $I_F = I_h + I_v$.

The values of the yaw rate and of the transverse acceleration $a_y$ can be calculated, for example, using these model equations. It may be provided that the functional block 23 in each case has a filter which is designed to filter the values for the transverse acceleration and/or yaw rate that have been determined by means of the model equations.

For these calculations, the measured steering angle $\delta_{Mes}$ may, for example, be used directly. In a manner differing from this, however, it may also be provided that the measured steering angle $\delta_{Mes}$ is first corrected by adding one or more correction values. For this purpose, a first adder 29 is provided in the embodiment of the method shown in FIG. 2. Instead of the measured steering angle $\delta_{Mes}$, a different steering angle variable may also be provided, for example a driver steering wheel angle converted to a corresponding wheel steering angle or else a set point or desired value for the wheel steering angle.

In addition, the transverse acceleration $a_y$ determined by means of the vehicle model 27 can be corrected by adding at least one further correction value A. To this end, a second adder 31 is provided in the illustrated embodiment. In an embodiment which is not shown, the second adder 31 is not provided.

The transverse acceleration $a_{y,Korr}$ is fed to a conversion block 32 which converts the transverse acceleration $a_{y,Korr}$ into a corresponding lateral force $F_{yv}$ on the front axle of the vehicle. This force may be, for example, a lateral guiding force. For this conversion, use may be made of the vehicle model 27 described above.

A third functional block 33 is designed to calculate a rack force FF as a function of the lateral force $F_{yv}$. Accordingly, the lateral force $F_{yv}$ is fed to the third functional block, and the third functional block 33 outputs a value FF which characterizes the rack force or corresponds thereto. The third functional block 33 comprises a signal processing element having a proportional-differential transfer function, which may be embodied, for example, as a PDT1 element 35. The transfer function of the PDT1 element 35 is as follows:

$$G(s) = \frac{FF}{F_{yv}} = K_p \cdot \frac{1 + T_v \cdot s}{1 + T_1 \cdot s}$$

The parameters $K_p$, $T_v$ and/or $T_1$ may be constant or may be predefined as a function of the vehicle speed v. The parameter $K_p$ may be predefined as a function of an axle ratio (ratio between a change in a rack travel and a change in the steering angle $\delta_{Mes}$, $\delta_{RW}$ or $\delta_{Mod}$).

In an embodiment which is not shown, the conversion block 32 is not present and the transverse acceleration $a_{y,Korr}$ is forwarded directly to the third functional block 33. Since the transverse acceleration $a_{y,Korr}$ is a variable which characterizes the lateral force $F_{yv}$, the rack force FF can also be calculated therefrom. If, for example, the vehicle model described here is taken as the starting point, a proportional relationship between the transverse acceleration $a_{y,Korr}$ and the lateral force $F_{yv}$ can be assumed. Therefore, in this embodiment which is not shown and which does not include the conversion block 32, for example the parameter $K_p$ can be selected such that the PDT1 element 35 calculates the rack force FF directly from the transverse acceleration $a_{y,Korr}$.

A first multiplier 37 may be provided in the functional block 33, this first multiplier being arranged downstream of the PDT1 element 35 and multiplying a signal output by the PDT1 element 35 by a factor $F(a_y)$, wherein the factor $F(a_y)$, depending on the exact configuration of the method 21, is dependent on the transverse acceleration $a_{y,Mod}$ determined by means of the vehicle model 27 or on the transverse acceleration $a_{y,Mes}$ measured by means of the acceleration sensor 20. The first multiplier 37 has the effect that the calculated rack force FF is reduced in the case of relatively high transverse accelerations $a_y$, whereby the rack force FF is calculated such that a target steering torque can be calculated which comes fairly close to the steering torque of a conventional, purely mechanical steering system. It is preferably provided that the factor $F(a_y)$ is lower in the case of relatively high transverse accelerations $a_y$ than in the case of relatively low transverse accelerations $a_y$.

In the simplest case, the rack force FF can be passed directly as a value FI to a second multiplier 39, which multiplies the rack force FI by at least one correction factor $P_{red}$ in order to determine a resulting rack force FR. The resulting rack force FR can be used, for example, to calculate the target steering torque.

Instead of connecting the output of the third functional block 33 directly to the second multiplier 39, there may be inserted between the third functional block 33 and the second multiplier 39 a linking element 41, which finds an intermediate value FI of the rack force, also taking into account the values F1, F2 for the rack force, which are calculated by other functional blocks 43, 45. The linking element 41 may link the values F1, F2, FF to one another in any way. It may form a linear combination or may select a value as a function of a mode of operation of the vehicle. By way of example, it may be provided that the rack force FF calculated by means of the third functional block 33 is used for one driving range of the motor vehicle, which is to say, in particular, during routine forward travel. In contrast, the further functional block 43 may calculate, for example, the rack force F1 for driving situations involving parking, and the further functional block 45 may describe an effect on the second rack force brought about by lifting of the vehicle as a function of the steering angle. In a manner differing from what is shown in FIG. 2, in addition to the two further functional blocks 43, 45, still further functional blocks may be provided so as to be able to calculate the rack force FI even more precisely. The functional blocks 33, 41, 43 and 45 together form a functional unit 47 for determining the intermediate value FI of the rack force. In an embodiment which is not shown, the second multiplier 39 is not provided, so that this intermediate value FI corresponds to the resulting rack force FR.

The method described hereabove for calculating the rack force FR is particularly suitable for motion states of the vehicle in which the vehicle model 27 is sufficiently accurate, and in particular in which the transverse acceleration $a_{y,Mod}$ can be calculated with sufficient precision. In such standard situations, preferably no values are added by the adders 29, 31 to the respective variables $\delta_{Mes}$ and $a_{y,Mod}$, and the multiplier 39 multiplies the intermediate value FI of the rack force by the value 1, so that FI=FR.

However, in order to be able to calculate the rack force in a sufficiently precise manner for special situations as well, the rack force is corrected through the addition of offset values O1, O2 by means of the adder 29 and/or 31 and/or through multiplication by the at least one correction factor $P_{red}$ by means of the second multiplier 39. Such special situations arise, for example, when the vehicle oversteers or understeers or when, particularly during braking, respectively different friction coefficients μ occur on the left and right tires of the vehicle (μSplit situation).

Figure 3:
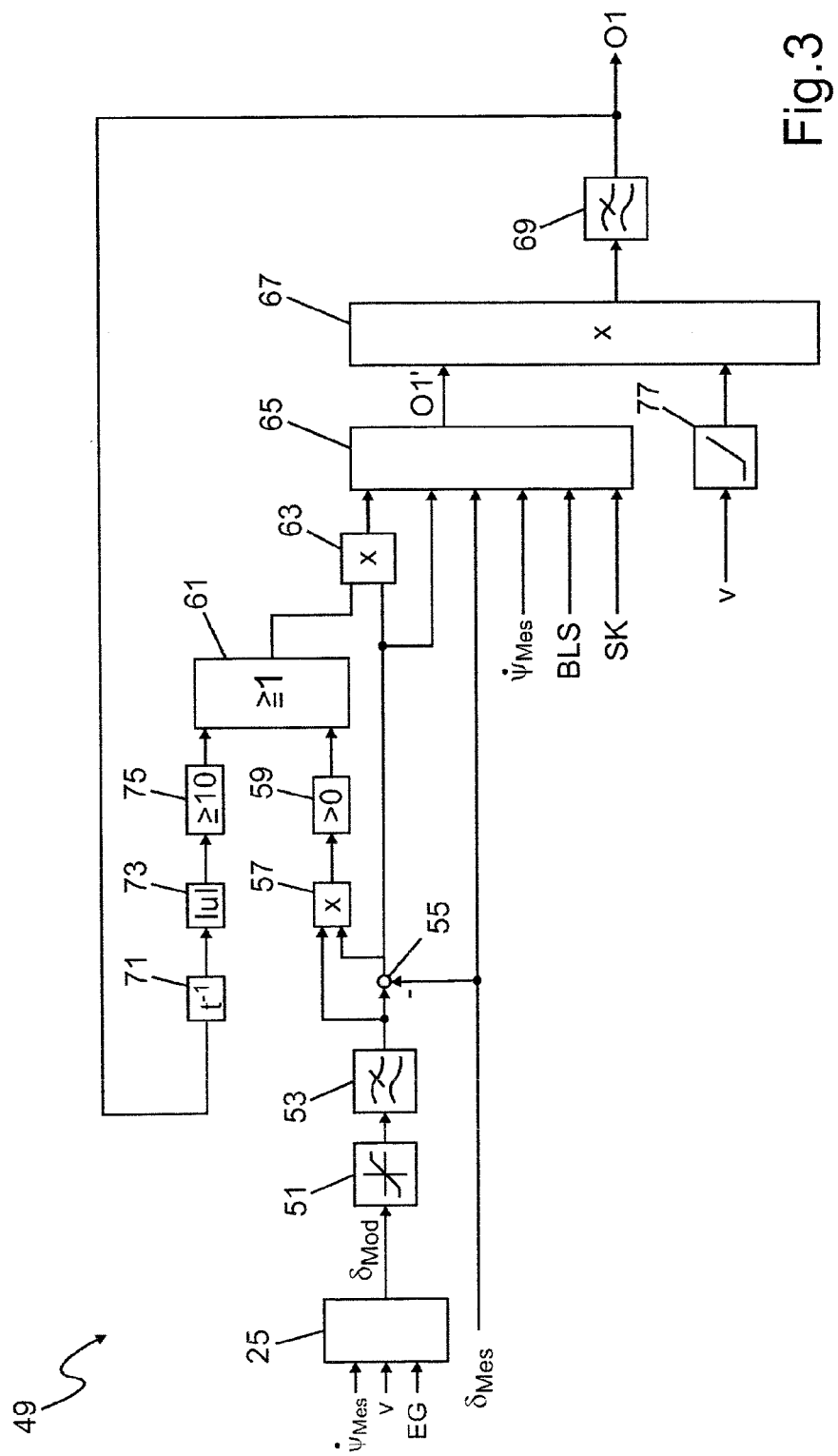

FIG. 3 shows functional blocks 49 of the method 21 for the combined correction both in the special situation of oversteering and also in the special situation of μSplit. A second functional block 25 is designed such that it calculates a modeled steering angle $\delta_{Mod}$ as a function of a measured yaw rate $\dot{\Psi}_{Mes}$, the vehicle speed v and the self-steering gradient EG. For calculating the modeled steering angle $\delta_{Mod}$ in the functional block 25, the equations of the vehicle model 27 may be used.

The modeled steering angle $\delta_{Mod}$ is fed to a gradient limiter 51, which limits the edge steepness of the modeled steering angle $\delta_{Mod}$. A first low-pass filter 53 follows the gradient limiter 51 in the signal flow. An output of the first low-pass filter 53 is connected to an input of a first subtractor 55. The measured steering angle $\delta_{Mes}$ is fed to a further input of the first subtractor 55, so that the first subtractor finds the difference from the modeled steering angle $\delta_{Mod}$ output by the first low-pass filter, this modeled steering angle having been filtered and limited in its edge steepness, and the measured steering angle $\delta_{Mes}$. As described above, the modeled steering angle $\delta_{Mod}$ is calculated on the basis of the yaw amplification and depends on the vehicle motion.

In normal driving situations, this angle $\delta_{Mod}$ corresponds at least substantially to the measured angle $\delta_{Mes}$. In the event of oversteering, however, there is a difference between these angles $\delta_{Mod}$, $\delta_{Mes}$, so that the difference calculated by means of the subtractor 55 indicates whether an oversteering situation does or does not exist. Oversteering exists either if the difference is positive with a positive yaw rate or if both variables (difference and yaw rate) are negative.

The output of the first low-pass filter 53 and the output of the first subtractor 55 are connected to inputs of a third multiplier 57, the output of which is connected to a first comparator element 59 which checks whether a signal generated by the third multiplier 57 is greater than 0. The signal at the output of the first low-pass filter 53 has the same sign as the yaw rate. Therefore, if the value of the signal generated by the third multiplier 57 is greater than 0, then the first comparator element 59 detects that an oversteering situation exists. The result of this comparison with 0 forms a release condition, which is fed via an OR gate 61 to a fourth multiplier 63, so that a signal at the output of the first subtractor 55 is applied to a block 65, whenever the first comparator element 59 detects that the signal generated by the third multiplier 57 is greater than 0.

The block 77, a fifth multiplier 67 following the block 65, and a second low-pass filter 69 following the fifth multiplier 67 calculate a first offset O1 for correcting the steering angle $\delta_{Mes}$.

The offset O1 is fed via a delay element 71 to an absolute-value generator 73. The method 21 can operate in a time-discrete manner and can be carried out using signal processing means which operate in a time-discrete manner. In this case, the delay element 71 may delay the value O1 by a sampling interval of the time-discrete signal processing system.

An output of the absolute-value generator 73 is connected to an input of a second comparator element 75, which is designed to check whether the absolute value of the signal O1 determined by means of the absolute-value generator 73 is greater than a given threshold value. If said value is greater than the threshold value, then the second comparator element 75 generates a further release signal which passes via the OR gate 61 to the fourth multiplier 63.

The fourth multiplier 63 thus releases the signal generated by the first subtractor 55, as soon as the value calculated by the third multiplier 57 is greater than 0. If the value output by the third multiplier returns to 0 or to a negative value, then the release signal is retained for as long as the absolute value of the signal O1 remains above the threshold value of the second comparator element 75. As a result, discontinuities in the curve of the signal O1 over time and thus also in the curve of the steering angle signal $\delta_{RW}$ over time are avoided.

The block 65 calculates an intermediate value O1' of the offset value O1 by multiplying the steering angle difference calculated by means of the first subtractor 55 by a predefined amplification factor. This amplification factor may be fixedly predefined or may be predefined as a function of the driving speed v. Furthermore, it may be provided that the block 65 limits the intermediate value O1', wherein this limiting may take account of the sign of the measured steering angle $\delta_{Mes}$, and the difference determined by means of the first subtractor 55.

In order to correct the steering angle $\delta_{Mes}$ for the special situation of oversteering, the release conditions logically linked by means of the OR gate 61 are taken into account, that is to say the block 65 accesses the value generated by the fourth multiplier 63, in order to calculate the intermediate value O1' of the offset O1 for the special situation of oversteering.

In order to be able to additionally correct the steering angle $\delta_{Mes}$ for the special situation of μSplit braking as well, the block 65 also accesses the angle difference determined by the first subtractor 55 directly, which is to say without the linking via the fourth multiplier 63. An offset for the additional angle for the μSplit situation is obtained by multiplying the angle difference by a factor which may be fixedly predefined or may be predefined as a function of the driving speed v. The offset for the μSplit situation may be inserted as a function of this angle difference. It may be provided that additional release conditions, for example the actuation of the brake and/or the existence of relatively low yaw rates $\dot{\Psi}$ and/or the existence of no banking turn, are taken into account and the offset for the μSplit situation is generated only when all the provided release conditions are met.

The intermediate value O1' of the offset O1 is therefore calculated in the block 65 as a function of a first value, which is determined for the situation of oversteering and a second value, which is determined for the μSplit situation. The intermediate value O1' may be determined for example such that the greater and/or larger (in absolute value terms) of the two stated values is always used as the intermediate value O1'. It may be provided that the second value assumes a value other than zero only when no banking turn SK exists. To this end, a signal SK which indicates a banking turn may be applied to the block 65.

The multiplier 67 multiplies the intermediate value O1' by a release condition. This release condition ensures that an offset value O1 other than 0 is generated only when a minimum speed is reached or exceeded. To this end, a characteristic diagram 77 is provided, into which the speed v is entered, and the output of which is connected to an input of the multiplier 67. Finally, the offset O1 is generated in that the signal generated by the fifth multiplier 67 is filtered by the second low-pass filter 69.

Figure 4:
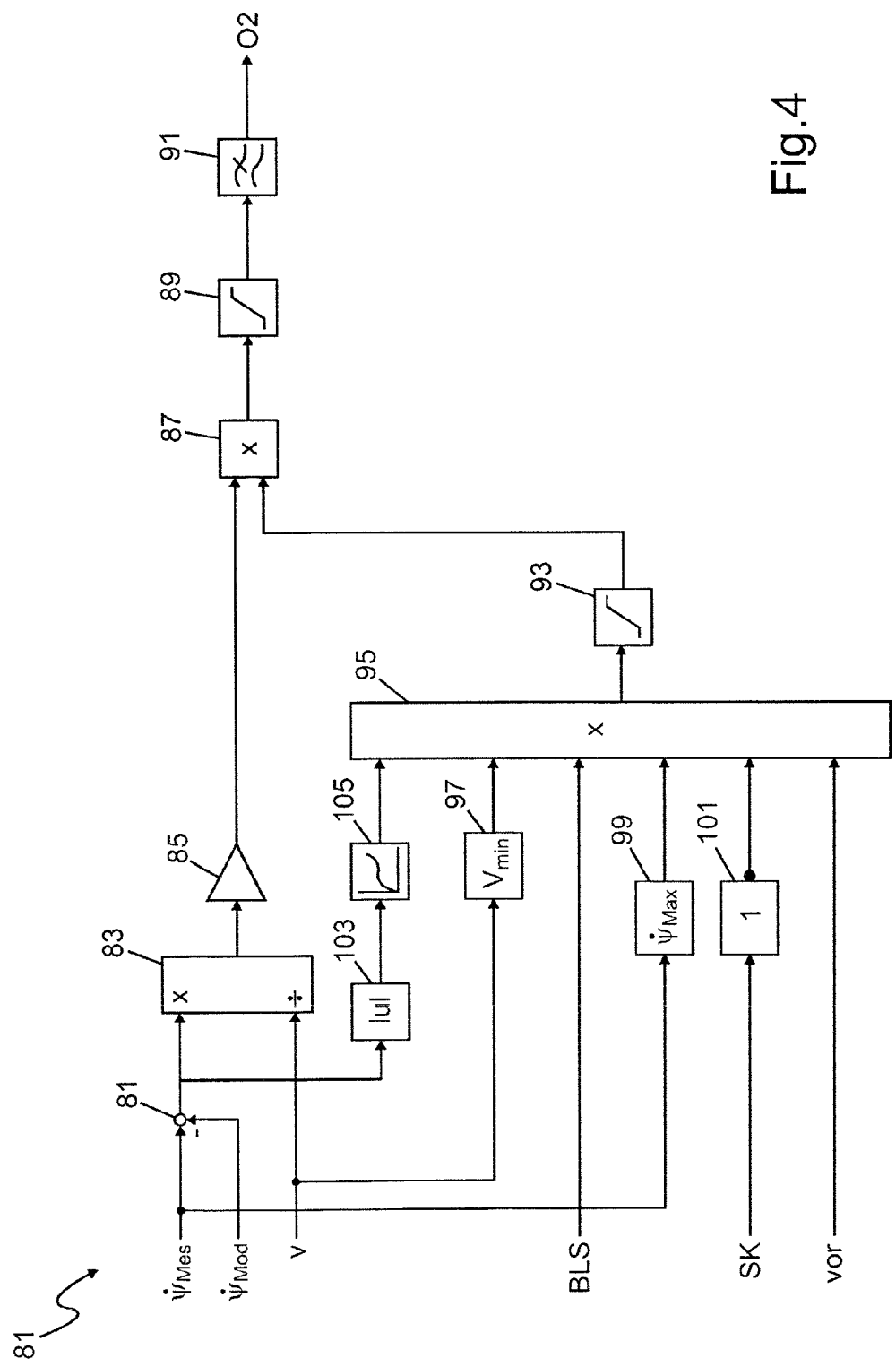

FIG. 4 shows functional blocks for calculating a further offset value O2 for correcting the steering angle $\delta_{Mes}$ in order to adapt the steering angle for the special situation of μSplit. A second subtractor 81 is designed to calculate a difference from the measured yaw rate $\dot{\Psi}_{Mes}$ and a modeled yaw rate $\dot{\Psi}_{Mod}$. The modeled yaw rate $\dot{\Psi}_{Mod}$ can be calculated, for example, by the block 23 (see FIG. 2) on the basis of the vehicle model 27 using the model equations given above. A divider 83 converts the difference between the two yaw rates $\dot{\Psi}_{Mes}$ and $\dot{\Psi}_{Mod}$ into an angle variable corresponding to said difference, by dividing this yaw rate difference by the speed v. A scaling element 85 which follows the divider 83 multiplies a quotient calculated by the divider 83 by a predefined factor.

An input of a sixth multiplier 87 is connected to an output of the scaling element 85. An output of the sixth multiplier 87 leads to an input of a limiter 89, the output of which is connected to an input of a third low-pass filter 91. The third low-pass filter 91 may be a PT1 element, for example.

A further input of the multiplier 87 is connected to an output of a limiter 93. An input of the limiter 93 is connected to the output of a seventh multiplier 95. The seventh multiplier 95, the limiter 93 and the sixth multiplier 87 have the effect that an offset value O2 other than 0 is generated only when release conditions are met, said release conditions being checked via inputs of the seventh multiplier 95. A first test element 97 applies a value other than 0 to an input of the seventh multiplier 95 only when the speed v is at least as great as a predefined minimum speed $v_{min}$. A second test element 99 ensures that the correction by generating a value O2 other than 0 takes place only when a low yaw rate $\dot{\Psi}_{Mes}$ (in absolute value terms) exists. That is to say, that the second test element 99 applies a value other than 0 to a corresponding input of the seventh multiplier 95 only when the measured yaw rate $\dot{\Psi}_{Mes}$ is less than or equal to a predefined maximum value $\dot{\Psi}_{Max}$. An inverter 101, the input of which is fed a signal indicating whether a banking turn exists, and the output of which is connected to an input of the seventh multiplier 95, has the effect that a value O2 other than 0 is generated only when no banking turn exists. Finally, a signal which indicates that forward driving is currently taking place is applied to a further input of the seventh multiplier 95. Consequently, a value O2 other than 0 is generated only in the case of forward driving of the vehicle.

The yaw rate difference $\dot{\Psi}_{Mes} - \dot{\Psi}_{Mod}$ generated by the second subtractor 81 is also passed to a further absolute-value generator 103, the output of which is connected to an input of a characteristic diagram 105. An output of the characteristic diagram 105 is connected to a further input of the seventh multiplier 95. The absolute-value generator 103 and the characteristic diagram 105 together with the seventh multiplier 95, the limiter 93 and the sixth multiplier 87 have the effect that the value O2 does not run with too steep an edge as the yaw rate difference $\dot{\Psi}_{Mes}\square\dot{\Psi}_{Mod}$ increases. In an embodiment which is not shown, it is provided that a further input of the seventh multiplier 95 is fed a signal which indicates whether a µSplit situation currently exists.

FIG. 5 shows a different approach for calculating the variable O2, in which, unlike in FIG. 4, a steering angle offset Δδ is predefined as an external variable. The external variable may be generated by another function of the control unit 1 or may be generated by another system or control unit of the vehicle, for example an electronic stability program (ESP) of the vehicle. As the release condition, the variable µ is used, which indicates whether a µSplit situation currently exists. The variable µ may be calculated in a suitable manner by the control unit 1 or may be predefined externally, for example by the electronic stability program. The multiplier 87 ensures that a variable O2 other than 0 is generated only in the event that the µSplit situation exists.

FIG. 6 shows that, in a corresponding manner, that is to say with the same functional blocks 87, 89, 91 which are also shown in FIG. 5, the steering angle $\dot{\Psi}_{Mes}$ for the case of oversteering can also be corrected. The steering angle offset Δδ is fed to one input of the sixth multiplier 87, and a signal OS transformed by means of a further characteristic diagram 107 is applied to another input. The signal OS indicates a degree of oversteering of the vehicle. The signal OS may be a percentage, for example. The signal OS may be generated in a suitable manner by the control unit 1 or it may be predefined externally, for example by the electronic stability program. Here, the filter 91 outputs the offset value O1 for the additive correction of the steering angle for the special situation of oversteering.

Figure 7:
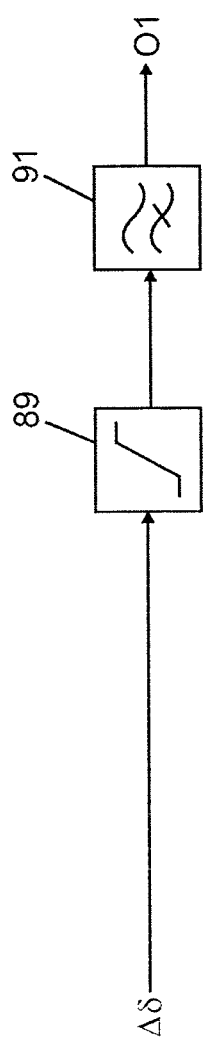

FIG. 7 shows an exemplary embodiment in which the offset value O is determined without taking account of a release condition or the signal OS. The steering angle offset Δδ is limited by the limiter 89 and is filtered by the filter 91, in order to form the offset value O. In embodiments which are not shown, the limiter 89 and/or the filter 91 is not present. That is to say, it is conceivable to use the steering angle offset directly as the offset value O (O=Δδ).

In addition, the rack force in the event of a special situation can be corrected by reducing it by the factor $P_{red}$. For this purpose, as shown in FIG. 2, the intermediate variable FI can be corrected by the factor $P_{red}$ by means of the second multiplier 39 in order to find the resulting rack force FR. The factor $P_{red}$ may be a percentage, for example. In this case, the factor $P_{red}$ can be divided by 100 before being applied to the input of the second multiplier 39. For this division, a suitable scaling element (not shown in FIG. 2) can be arranged in front of the corresponding input of the second multiplier 39.

Figure 8:
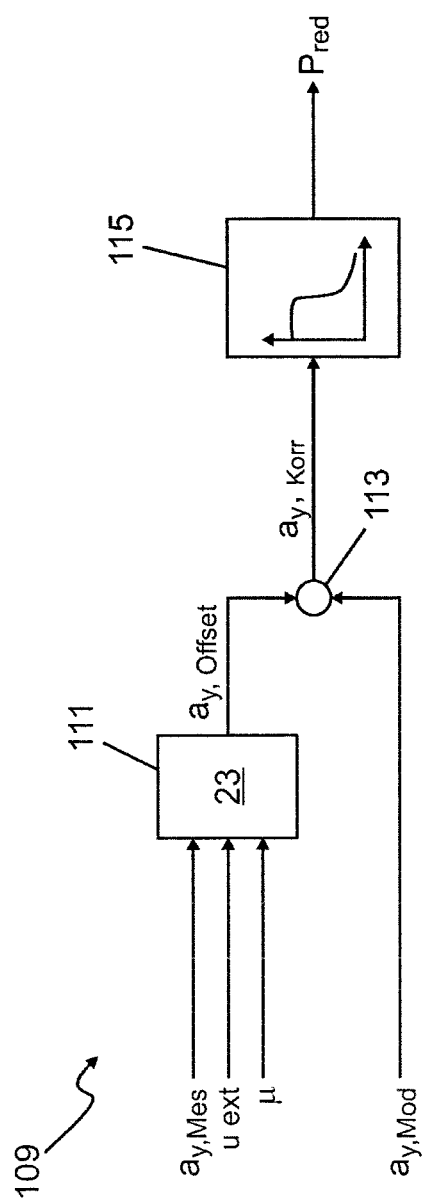

The factor $P_{red}$ may be determined, for example as shown in FIG. 8. A functional block 111 generates the variable $a_{y,Off}$, according to one of the approaches described below. A further adder 113 forms a corrected transverse acceleration $a_{y,korr}$ by adding the variable $a_{y,offset}$ and the modeled transverse acceleration $a_{y,Mod}$. In a manner differing from this, the corrected transverse acceleration $a_{y,korr}$ can also be calculated by adding the variable $a_{y,offset}$ and the measured transverse acceleration $a_{y,korr}$. The corrected transverse acceleration $a_{y,korr}$ is then converted into a value of the factor $P_{red}$ by means of a further characteristic diagram 115, the characteristic curve of which may have, for example, a uniformly falling profile.

In the illustrated embodiment, the functional block 111 also finds the variable $a_{y,Offset}$ as a function of at least an external signal uext, which indicates the special situation of understeering and/or characterizes a degree of understeering s. As a result, the rack force for the situation of understeering is corrected. In an embodiment which is not shown, the external signal uext is not provided.

In the special situation of understeering, the rack force can also be corrected on the basis of a transverse acceleration difference $a_{y,Mod}$, $a_{y,Mes}$. This transverse acceleration difference is calculated from the transverse acceleration $a_{y,Mod}$ determined by means of the vehicle model 27 and a measured transverse acceleration $a_{y,Mes}$. The following is then obtained as the corrected transverse acceleration $a_{y,Korr}$ $$a_{y,Korr} = a_{y,Mod} + (a_{y,Mod} - a_{y,Mes})$$

The corrected transverse acceleration $a_{y,Korr}$ is calculated by an adder 113 shown in FIG. 8.

In addition, it may be provided that the transverse acceleration difference is amplified through multiplication by an amplification factor. This factor may be found for example as a function of the transverse acceleration difference $a_{y,Mod}$, $a_{y,Mes}$ itself. When there is a high degree of friction between the tires of the vehicle and the road, the transverse acceleration difference is at least approximately 0 since the vehicle model 27 describes in a relatively precise manner the actual motion state of the vehicle. In the case of a low friction value, the transverse acceleration difference increases in absolute value terms, because the vehicle model 27 assumes a higher transverse acceleration $a_{y,Mod}$ than is actually achieved. By taking account of the transverse acceleration difference or the transverse acceleration difference amplified by the factor, it is possible to achieve the situation whereby the rack force FR is more realistic than the intermediate variable FI.

Furthermore, it may be provided that the correction offset $a_{y,Offset}$ is determined as a function of a friction value µ. The friction value µ may be calculated for example by the control unit 1 or by a control unit other than the control unit 1, for example a separate control unit. It is conceivable, that the friction value µ is determined on the basis of a comparison of the calculated rack force FR and a force actually applied to a rack of the steering apparatus 2 or to another actuating element of the steering apparatus 2. The force actually applied can be detected by means of a force sensor or a torque sensor, for example.

The corrected transverse acceleration is thus obtained according to the following equations $$a_{y,Korr} = a_{y,Mod} + a_{y,Offset}$$

$$a_{y,Offset} = f(\mu)$$

In the exemplary embodiment described here, values for, in particular, the yaw rate, the transverse acceleration and the steering angle are denoted by the addition of "Mod" when they are determined using the model equations of the vehicle model, optionally with subsequent filtering. Measured values for, in particular, the yaw rate, the transverse acceleration and the steering angle are denoted by the addition of "Mes". For variables which are not denoted by either "Mod" or "Mes", either a measured value or a value calculated by means of the model equations can be used.

Overall, the method 21 described here allows the precise and reliable calculation of the rack force FR, in particular for the driving range. The method 21 can easily be adapted to a specific vehicle by varying individual parameters. In addition, in the method described here, the rack force FR can be generated with good precision even when the vehicle is in a special situation. Thus the rack force FR calculated by the method 21 is particularly suitable as an input variable for calculating a target steering torque, to which an actual steering torque is to be adjusted, in particular so as to give the driver of the vehicle good feedback regarding the current driving situation, even in special situations.

The invention claimed is:

1. A method for determining a rack force for a steering apparatus of a vehicle, in which the rack force is determined as a function of a steering angle variable, which characterizes an actual wheel steering angle or a set point of the wheel steering angle wherein the method comprises:
determining a variable which characterizes a lateral force on a shaft of the steering apparatus, and
determining the rack force as a function of the lateral force, wherein the determination of the rack force comprises a filtering by means of a signal processing element having a proportional-differential transfer function.

2. The method according to claim 1, wherein the signal processing element is a PDT1 element.

3. The method according to claim 1, wherein at least one coefficient, and preferably all the coefficients of a transfer function of the signal processing element are predefined as constant values.

4. The method according to claim 1 wherein at least one coefficient is varied during the execution of the method.

5. The method according to claim 4, wherin the at least one coefficient is predefined as a function of a vehicle speed or a variable derived therefrom.

6. The method according to claim 1, wherein an intermediate variable determined by means of the signal processing element is multiplied by a scaling factort.

7. The method according to claim 6, wherein the scaling factor is found as a function of a transverse acceleration of the vehicle.

8. The method according to claim 1, wherein the rack force is corrected by modifying a measured wheel steering angle by adding an offset value to the measured wheel steering angle.

9. The method according to claim 8, wherein in order to calculate the offset value, a modeled steering angle is determined, preferably as a function of a yaw rate a vehicle speed and a self-steering gradient, and is compared with a measured steering angle.

10. The method according to claim 9, wherein in order to compare the modeled steering angle with the measured steering angle a steering angle difference is found.

11. The method according to claim 10, wherein if the modeled steering angle, or a variable derived therefrom, and the steering angle difference have different signs, an oversteering of the vehicle is detected.

12. The method according to claim 9, wherein as a function of the comparison of the modeled steering angle with the measured steering angle, preferably as a function of the steering angle difference, a first correction value for correcting the rack force in the event of oversteering of the vehicle is determined and a second correction value for correcting the rack force in a situation is determined, and in that a maximum of the first correction value and of the second correction value is used as the offset value.

13. The method according to claim 12, wherein a first correction value other than zero is found for as long as the oversteering is detected or the offset value is at least as great as a predefined threshold value.

14. The method according to claim 8, wherein an offset value other than zero is found if the speed of the vehicle is at least as great as a speed minimum value.

15. The method according to claim 1, wherein the rack force is corrected by modifying it by multiplication by a correction factor.

16. The method according to claim 15, wherein the correction factor is calculated as a function of the transverse acceleration of the vehicle.

17. The method according to claim 15, wherein the correction factor is calculated as a function of a transverse acceleration difference obtained from a transverse acceleration determined using the vehicle model and a measured transverse acceleration.

18. The method according to claim 15, wherein the correction factor is calculated as a function of a detected or determined friction value.

19. A control and/or adjustment device for a steering apparatus of a vehicle, wherein the control and/or adjustment device is designed to determine a rack force as a function of a steering angle variable, which characterizes an actual wheel steering angle or a set point of the wheel steering angle, wherein the control and/or adjustment device is designed:
to determine a variable which characterizes a lateral force on a shaft of the steering apparatus, and
to determine the rack force as a function of the lateral force, wherein the determination of the rack force comprises filtering by means of a signal processing element having a proportional-differential transfer function.

20. The control and/or adjustment device according to claim 19, wherein the control and/or adjustment device is designed to carry out a method.

21. A steering apparatus of a vehicle, comprising a control and/or adjustment device, wherein the control and/or adjustment device is designed to determine a rack force as a function of a steering angle variable, which characterizes an actual wheel steering angle or a set point of the wheel steering angle, wherein the control and/or adjustment device is designed according to claim 19.

* * * * *